(No Model.)
W. M. JEWELL.
CONTROLLER.
No. 598,935. Patented Feb. 15, 1898.
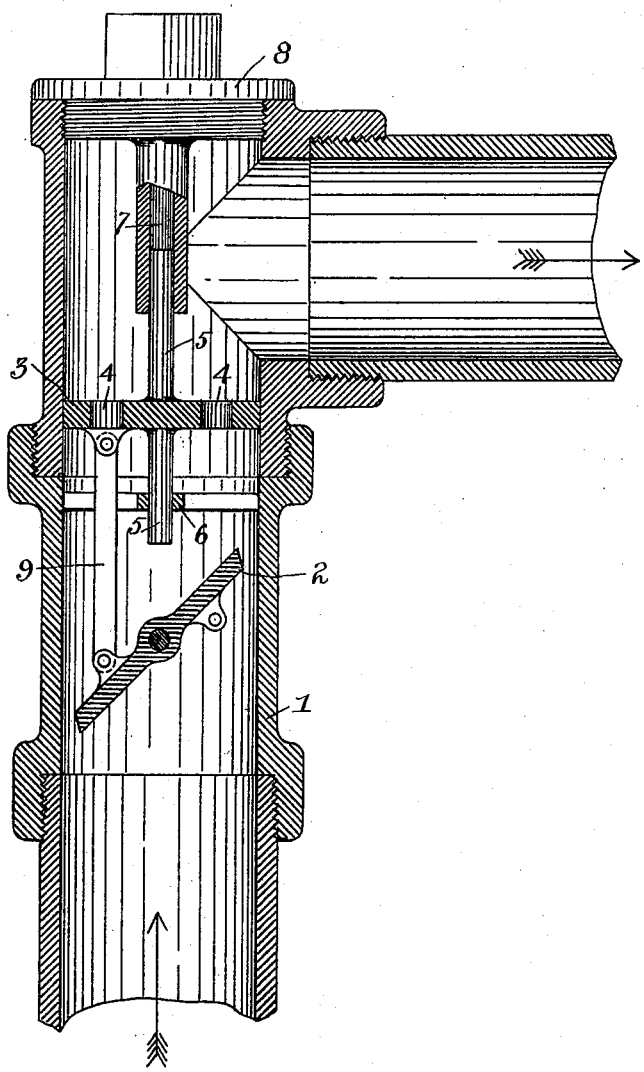
Witnesses
Walter Wagner
Wm. M. Rheem.
Inventor
William M. Jewell,
By his Attorneys
Bond Adams Pickard & Jackson.

UNITED STATES PATENT OFFICE.

WILLIAM M. JEWELL, OF CHICAGO, ILLINOIS, ASSIGNOR TO THE O. H. JEWELL FILTER COMPANY, OF SAME PLACE.

CONTROLLER.

SPECIFICATION forming part of Letters Patent No. 598,935, dated February 15, 1898.

Application filed November 23, 1896. Serial No. 613,102. (No model.)

*To all whom it may concern:*

Be it known that I, WILLIAM M. JEWELL, a citizen of the United States, residing at Chicago, in the county of Cook and State of Illinois, have invented certain new and useful Improvements in Controllers, of which the following is a specification, reference being had to the accompanying drawing, in which the figure is a vertical section of a water-pipe, showing my improved controller.

My invention relates to controllers, and particularly to those used for controlling the flow of liquids, such as are used for regulating the flow of water through filters, and for other purposes.

It has for its object to provide an improved controller which will be simple in construction and effective in operation. I accomplish this object as hereinafter specified and as illustrated in the drawing.

That which I regard as new will be set forth in the claims.

Referring to the drawing, 1 indicates a water-main, in which is pivoted a balanced valve 2 of the butterfly pattern shown in the drawing.

3 indicates a piston having passages 4, said piston being arranged to move vertically in the main 1. The piston 3 has a stem 5, the lower end of which passes through a suitable bearing in a skeleton guide-plate 6, the upper end of said stem moving in a bearing 7, carried by a cap 8, screwed into the upper end of the main 1, as shown in the drawing.

9 indicates a connecting-rod which connects the piston 3 with the valve 2 at one side of its pivot in such manner that as the piston 3 rises the valve 2 will be rocked to close the passage in the main 1, and when the piston descends the valve 2 will be opened.

The controller above described is operated by the friction of the liquid in passing through the openings 4 in the piston. The adjustments being such that the friction of the flowing liquid through the piston is equal to the weight of the piston, the said piston will remain stationary, as the valve 2 is balanced. If, however, the pressure of the liquid in the main below the piston increases, the friction of the liquid passing through the orifices or passages in the piston will be increased and the piston will be caused to rise, thereby closing the valve 2, and said piston will continue its upward movement until the valve has been closed sufficiently to reduce the pressure upon the piston to a point where the friction will balance the weight of the piston. The result is that the flow of liquid will be at all times automatically maintained at a constant rate. By providing a closed bearing 7 for the upper end of the piston-stem 5 the piston is prevented from jumping, as the bearing fills with water, which must escape before the piston can move upward. The rate of flow may be changed by changing the size of the passages in the piston 3.

Instead of providing the piston 3 with perforations or orifices within its periphery, as shown, the same effect may be accomplished by reducing the diameter of the piston so as to provide a passage around it, or, if desired, a combination of both arrangements may be used, the object being to provide a movable device which will constrict the passage of the liquid and which will consequently be adapted to be operated by the friction of the liquid flowing around it.

I have described my improved controller as applied to flowing liquids; but it will be understood that it may be employed also for controlling gas and other fluids.

That which I claim as my invention, and desire to secure by Letters Patent, is—

1. A controller consisting of a suitable casing, a piston therein constricting the fluid-passage, and a butterfly-valve controlling the fluid-passage and adapted to be operated by the movement of said piston, substantially as described.

2. A controller consisting of a pipe, a perforated piston adapted to reciprocate therein, and a balanced butterfly-valve controlling the fluid-passage and connected at one side of its pivot to, and operated by said piston, substantially as described.

3. The combination with a pipe, and a perforated piston adapted to reciprocate therein, of a balanced butterfly-valve connected to said piston and adapted as the piston moves, to regulate the size of the fluid-passage, and guides for said piston, substantially as described.

4. The combination with a pipe, and a perforated piston adapted to reciprocate therein, said piston having a stem, of a balanced valve connected to said piston and adapted to regulate the size of the fluid-passage, and a closed bearing for the stem of said piston, substantially as and for the purpose specified.

WILLIAM M. JEWELL.

Witnesses:
 JOHN L. JACKSON,
 ALBERT H. ADAMS.